Figure 1:
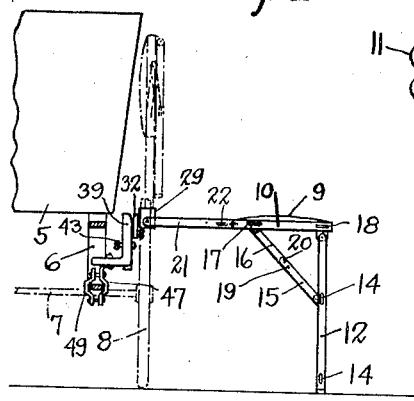

Nov. 2, 1926.

A. KRUGLY ET AL 1,605,550

SEAT ATTACHMENT FOR BABY CARRIAGES

Filed April 9, 1925

INVENTORS
AARON KRUGLY
SAMUEL SHEIMAN
BY
Maurice Block
ATTORNEY

Patented Nov. 2, 1926.

1,605,550

UNITED STATES PATENT OFFICE.

AARON KRUGLY, OF NEW YORK, AND SAMUEL SHEIMAN, OF BROOKLYN, NEW YORK.

SEAT ATTACHMENT FOR BABY CARRIAGES.

Application filed April 9, 1925. Serial No. 21,778.

This invention relates to seats or stools and in particular to one adapted to be used in connection with a baby carriage which, when not in use by the nurse tending the child, may be folded up to a position against the side of the carriage.

A particular object of the invention is to provide a seat which can be adjusted in many different ways to compensate for differences of level of the ground, different heights of the wheels, and different angular positions of the seat relatively to the wheels of the carriage when said seat is folded up.

A further object of the invention is to provide a seat of simple construction which will be strong, yet durable and which will readily withstand rough usage to which such a seat is necessarily subjected.

Figure 2:
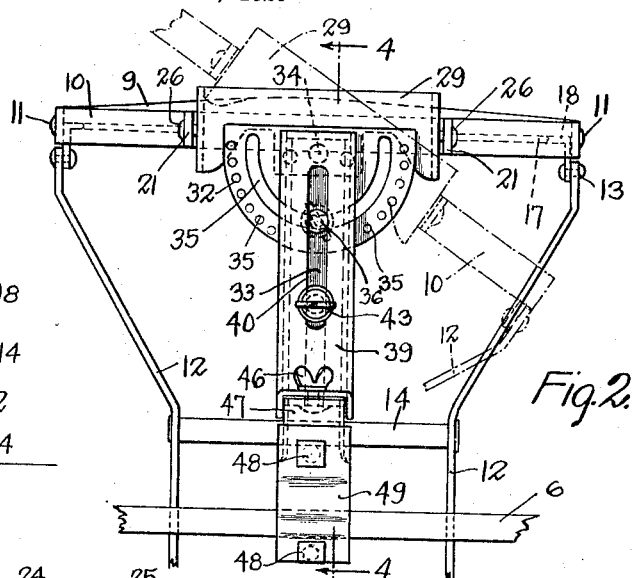
Figure 3:
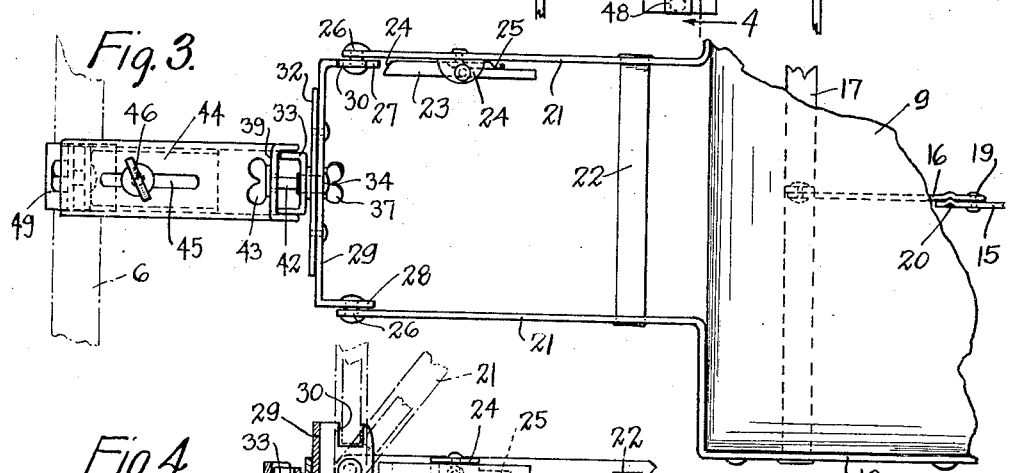
Figure 4:
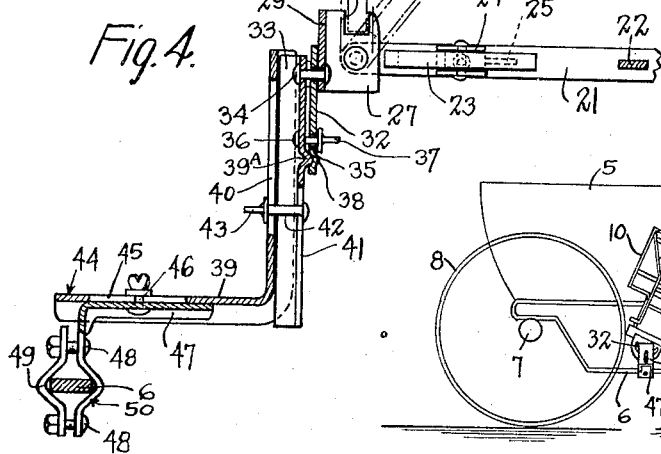
Figure 5:
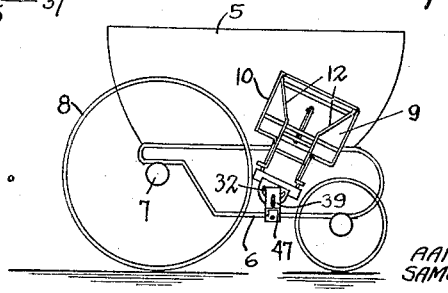

Referring to the drawing wherein we have shown a preferred embodiment of our invention;

Figure 1 is a front view in elevation of a baby carriage having attached thereto our improved seat, the frame of the carriage being shown in section, Figure 2 is an enlarged end view of the seat, the view being taken from the end of the seat frame which engages the baby carriage, Figure 3 is an enlarged top plan view of the seat as shown in Figure 1, the carriage frame being shown in outline, Figure 4 is an enlarged section in elevation taken on the line 4—4 of Figure 2, showing the construction of the seat frame, the seat itself being omitted, and Figure 5 is a side view of a carriage showing how the seat can be adjusted and folded so as not to interfere with the wheels.

Referring to the drawing in detail 5 indicates the body and 6 the running gear or lower framework of a baby carriage, the frame being mounted on the axles 7 which carry the usual wheels 8.

The stool consists of the padded seat portion 9 bound by the frame iron 10 to which the seat is fastened in any suitable manner such as by rivets 11, the rear of the frame being provided with ground engaging legs 12 which are pivoted as at 13 to the seat frame. The legs are held in spaced relation by tie bars 14 from the upper of which extends the foldable brace, the part 15 thereof being pivoted to the tie bar 14 while the part 16 is pivoted to the tie bar 17 which with tie bar 18 forms a bottom for the seat cushion 9. The brace parts 15 and 16 are pivoted together as at 19 and their pivotal movement in one direction is limited by depressions 20 formed in each, but they may be folded up to bring the legs in folded position against the bottom of the seat, when the entire structure is folded up against the side of the baby carriage.

The forward extensions 21 of the frame are held in spaced relation by the tie bar 22, and one of the extensions is provided with a snap latch 23 which is pivotally held in a suitable saddle 24 secured to said extension 21. The end of the latch is rounded as at 24 and the whole is caused to normally maintain the position shown in Figure 3, that is against the extension 21, through the medium of the spring 25. The ends of the extensions are pivoted as at 26 to the ears 27 and 28 formed on the ends of a transversely disposed frame carrier 29, the ear 27 having cut therein a notch 30 into which the latch 23 snaps to lock the frame in vertical position as shown in outline in Figure 4. The corner of the ear 27 is rounded as at 31 so that the end of the latch which is also rounded will ride up on the ear to subsequently snap into the notch 30.

The carrier 29 has riveted thereto at its center the semicircular plate 32, and also carries a vertically disposed channel piece 33, the latter being pivoted relatively to the plate 32 and carrier 29 through the medium of a rivet 34 passing therethrough. The plate 32 is provided with a semicircular slot 35 through which passes the bolt 36 carrying at its end the wing nut 37, the bolt passing also through the piece 33 and being adapted to bind the piece 33 and plate 32 together when the wing nut 37 is tightened up. The plate 32 is therefore pivoted relatively to piece 33 and can be swung around to throw the seat, when folded up, in any angular position necessary to maintain said seat out of contact with the wheels as shown in Figure 5. To allow of step by step adjustment of the plate relatively to the piece 33 I provide in the plate adjacent its periphery a series of depressions 38 into which fit a matching depression 39A formed in the channel piece 33.

The channel piece 33 fits between the side walls of an L-shaped bracket 39 which itself is of channel formation and has in its face a slot 40, there being also a slot 41 in the piece 33, and through these two slots extend a bolt 42 having a nut 43 thereon, the bolt in combination with the slots 40 and 41 providing an adjustment between the bracket 39 and piece 33 whereby the bracket can be raised or lowered to allow for different heights of carriage frames from the ground.

The horizontally disposed portion 44 of bracket 39 is provided with a slot 45 through which extends a bolt 46, the bolt being secured by force fit or other suitable means in the clamp piece 47, the outer end of which is turned down and carries through the medium of the screws 48 the mating clamp piece 49, the both being formed substantially diamond shaped as at 50 so that they may be clamped around the square round or flat frame piece of a baby carriage. The slot 45 in bracket 39 allows of adjustment of the seat toward and away from the carriage as desired.

Thus it will be noted that in carriages having one set of large and one set of small wheels the problem of providing a seat has been overcome by incorporating in the seat frame the various adjustments necessary for folding the seat up so that it will not interfere with the wheels when out of use, and also adjustments are possible with our improved seat for meeting any conditions such as a relatively low frame of a carriage, high wheels, or low wheels and uneven surface of the ground.

The various adjustments are made by operating the various bolts and the seat may be folded up to a compact position adjacent the body of the carriage without interference to wheels or passers-by.

Having described our invention what we claim is:—

1. A stool for baby carriages, said stool being adapted to be folded up, and comprising a seat member, a holder adapted to be secured to the carriage and said seat, means for adjusting the holder with respect to said carriage in a vertical and a horizontal direction, and in a plane parallel to the folded position of said seat, and means for angular adjustment of seat in relation with carriage and holder.

2. A stool for baby carriages, said stool being adapted to be folded and comprising a seat member, legs foldably connected therewith, a latch member pivotally secured to said seat member, a holder to which the said seat is pivotally connected, means for giving said holder a pivotal motion in a plane parallel to the folded position of said seat, and ears on said holder one of which is adapted for locking engagement with said latch member when the stool is in folded position.

3. A stool for baby carriages, said stool being adapted to be folded up, comprising a seat member, legs foldably connected therewith, a latch member pivotally secured to said seat member, a holder to which the said seat is pivotally connected, means to permit said holder to be pivoted in a plane parallel to the folded position of said stool, ears on said holder, one of which is adapted for locking engagement with said latch member when the stool is in folded position, an extendable bracket for holding the stool to the carriage, an arcuate plate member adjustably connected to said bracket and said holder, and means whereby the plate can be partly revolved relatively to said bracket to position the seat at an angle relatively to its normal vertical folded position.

AARON KRUGLY.
SAMUEL SHEIMAN.